Patented Dec. 26, 1939

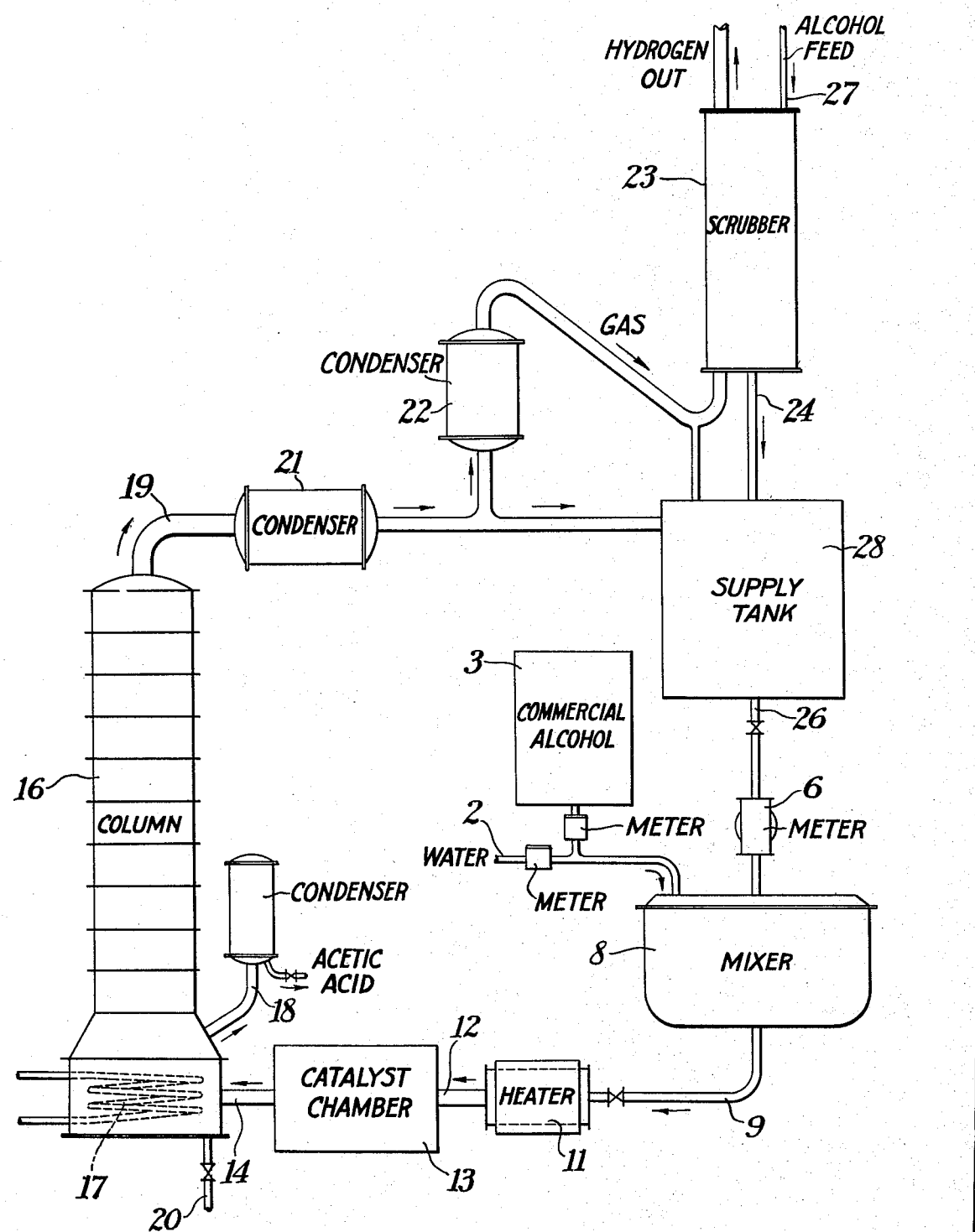

2,184,555

UNITED STATES PATENT OFFICE 2,184,555

MANUFACTURE OF ALIPHATIC ACIDS

William O. Kenyon, Rochester, N. Y., assignor to Eastman Kodak Company, Rochester, N. Y., a corporation of New Jersey Application September 22, 1936, Serial No. 101,985

11 Claims. (Cl. 260—530)

This invention relates to the manufacture of aliphatic acids from alcohols, aldehydes and water, and more particularly to a process for producing acetic acid from ethyl alcohol, acetaldehyde and water, by reaction in the presence of a catalyst.

The economic production of aliphatic acids is a problem of considerable commercial importance. Large amounts of acetic acid and other aliphatic acids are consumed in the manufacture of cellulose esters and other cellulosic compounds, and in the manufacture of numerous other chemical materials. At present, a large amount of these acids is produced from the destructive distillation of wood, although propionic and butyric acids are also produced synthetically and by fermentation. Therefore, the development of a simple and inexpensive method for manufacturing aliphatic acids and in particular acetic acid from a readily available source of material is a desirable result.

In present-day industry large amounts of aqueous alcohol are being produced, of a quality unsuitable because of the water content for some of the well-established usages. I have found a method and catalyst whereby aqueous alcohols may be converted to aliphatic acids.

U. S. Patents 1,663,350 and 1,821,324 on the catalytic production of acetone from ethyl alcohol, acetaldehyde and water indicate that some acetic acid may be formed. Likewise, U. S. Patent 1,975,853 on the production of ethyl acetate from 95% ethyl alcohol indicates that about 1% of acetic acid may be formed. British Patent 331,883 on the production of acetaldehyde indicates that some acetic acid may be formed. However, it is clear from consideration of these processes that the patents were concerned with the production of some material other than an aliphatic acid. In German 565,476 and British 427,631 processes are shown wherein the production of larger amounts of acid are obtained.

Processes for the manufacture of aliphatic acids are also shown in Hale U. S. Patents 2,027,377 and 2,027,378. It is processes of this type that my invention is more particularly concerned with, my process constituting a distinct modification thereof.

I have developed a new process for converting aqueous alcohol from commercial sources, or alcohol from other sources mixed with varying amounts of aldehyde, water and other components into aliphatic acids together with apparatus, catalysts and related means for accomplishing the following objects:

This invention has as an object to provide a process for producing aliphatic acids from aqueous solutions containing the corresponding alcohols, aldehydes and other components. Another object is to provide a continuous process for converting aqueous solutions of ethyl alcohol and acetaldehyde into acetic acid. A still further object is to provide a process particularly adapted for the conversion of aqueous ethyl alcohol solutions to acetic acid. Still another object is to provide a process for converting ethyl alcohol, propyl alcohol or butyl alcohol or their aldehydes to the corresponding acids.

Another object is to provide a new catalyst particularly suitable for use in the conversion of aqueous alcohol and aldehyde solutions to aliphatic acids. Another object is to provide a method for the production of this catalyst. Still another object is to provide apparatus for carrying out my process. Other objects will appear hereinafter.

As established in the field of catalysis, the state and character of a catalyst employed is of material importance in determining the various yields and type of material produced in catalytic processes. After considerable investigation, I have found that it is possible to produce considerable quantities of aliphatic acids from water, alcohols and aldehydes, providing the reaction is carried out in the presence of the proper catalyst and under the proper operating conditions. For example, in the case of aqueous ethyl alcohol solutions containing more or less acetaldehyde, these components may be readily converted to acetic acid by catalytic reaction in the presence of my novel alloy catalysts.

I offer no particular theory of operation for my process. However, it possibly may be that the alcohol is converted to aldehyde which in turn is further converted to acid in accordance with the following, where R designates an alkyl group:

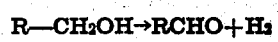

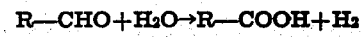

This may be evidenced by the fact that considerable quantities of hydrogen are liberated in my processes. Or, it may be that the water adds directly to the alcohol and/or aldehyde and forms some complex compound which subsequently breaks down into acid and hydrogen.

For further details concerning my new processes and for more complete understanding of my invention, reference is made to the accompanying drawing forming a part of the present application.

The accompanying drawing, in which like reference characters refer to like parts, is a diagrammatic side elevation of one set-up of apparatus for practicing my new process.

The drawing may be understood to a large extent merely by reference to the legends appearing thereon. However, further consideration of the drawing will be had under the description hereinafter concerning my processes employed for the treatment of aqueous ethyl alcohol solutions. The treatment of this alcohol is described primarily for the purpose of illustration and my new process, catalyst and apparatus is not to be construed as limited to the treatment of aqueous ethyl alcohol, excepting that this is my preferred embodiment.

Referring now to the drawing, numerals 2 and 3 designate supplies for water and alcohol respectively. These components may be supplied by means which may also serve to introduce fluid pressure of some nature, whereby the alcohol, water, aldehyde and other reaction components may be forced into the system under pressure if desired. In addition, there is the main alcohol feed 27, 28. While as indicated above, I describe my process as being applied to aqueous ethyl alcohol, sometimes it happens that the water components of the aqueous alcohols are insufficient; hence, I have provided the supply 2 whereby supplemental water may be mixed with the source of alcohol which I wish to treat to give the desired water content. Suitable flow meters at 6 and other desired points may be provided for measuring the feed into mixer 8. Various shut-off valves are provided wherever needed in the system. Conduit 9 is provided to connect the mixer through heater 11 with the catalyst unit 12.

This unit 12 may comprise a catalyst tube enclosed in the container 13 in which a heating medium is included. The catalyst tube 12 is connected by means of conduit 14 to the column 16 of any usual construction. Heating means 17 and acid draw-offs 18 and 20 are provided at the lower portion of the column. The column 16 is provided with the off-take conduit 19 which leads to condensers 21, 22, scrubber or other means 23, and from thence back for recirculation through the system by means of conduits 24, 26.

Although I have shown the two sources of feed and a single catalyzer, I contemplate employing several catalyzers in series as well as several feed tanks or other modifications to increase the capacity and efficiency of the apparatus shown.

It has already been indicated that the choice of catalyst in my process is of particular importance. One type of catalyst which will be referred to as an "alloy catalyst" and which gives very satisfactory results may be prepared as follows:

Approximately 900 parts by weight of metallic copper, such as copper shot, for example, was melted in a crucible with a small amount of siliceous material to form a slag with any oxides which might be possible. To this was added about 100 units by weight of zinc and about 42 units by weight of manganese. When all of these constituents had been completely melted the mixture was stirred with a carbon rod and then cast into a mold, preferably a cylindrical mold. After cooling and washing in water, it may then be converted into the correct physical form and used. That is, the alloy was placed in a lathe or other mechanical device and transformed into rough chips or particles of the desired size by means of employing a deep dragging cut.

Analysis of the catalyst should show around 70–90% copper, 5–15% zinc, and 2–10% manganese.

A sufficient quantity of this alloy catalyst to fill the catalyst chamber being employed was then oxidized, for example, by heating in a muffle furnace at around 500° C. to 1000° C. for 50–70 hours. The oxide may then be reduced. One convenient method of doing this would be by placing the oxidized alloy catalyst in a catalyst tube and reducing it by passage therethrough of hydrogen or alcohol while maintaining the catalyst tube at a temperature in the neighborhood of 250°–350° C. By computation of the weight of the oxide charged and the amount of water liberated during the reducing action which will, of course, be dependent on whether the alcohol or the hydrogen is used, it will be readily determined when the reduction has proceeded to a sufficient extent so that at least the copper oxide content is entirely reduced. Possibly the zinc and manganese oxide components will have been reduced to some extent.

After the apparatus has been assembled as shown in the drawing or some other suitable apparatus assembled for operation, my novel catalytic process may then be carried out. The following example is an illustration of my preferred process. It is to be understood that the specific material and the like set forth in the present example are set forth for the purpose of illustration and represent the preferred embodiment.

Ethyl alcohol contained in feed tank 3 may be allowed to flow by gravity, pumped, or otherwise caused to flow through a flow meter into the mixer 8. If the ethyl alcohol and other components such as acetaldehyde, which are being fed, do not contain sufficient water, additional water may be supplied from 2 through a flow meter until a suitable aqueous feed is obtained. Suitable compositions of aqueous alcohol will be observed in more detail hereinafter from the table. A suitable aqueous mixture was passed from mixer 8 through conduit 9 which, if desired, may be subjected to heat at 11 in order that the aqueous alcohol may be preheated to some extent. The aqueous alcohol then passed into the catalyst unit which, as already indicated, may comprise one of several sets of tubes operating simultaneously or intermittently. The catalyzer is preferably maintained at a temperature somewhere from 275° C. to 425° C., depending upon the mixture being fed and other factors. Temperatures in the neighborhood of 310° C. to 330° C. or 340° C. appear quite satisfactory in most instances. The temperature of the catalyst may be maintained at a fairly constant value by a suitable heating system such as flowing hot oil, mixtures of certain organic materials, salts, or electrical heating may be employed. The mixture passing through the catalyzer yields a product comprising a substantial amount of aliphatic acid, unreacted alcohol, water and aldehyde, and a substantial amount of hydrogen.

These reaction products pass out of the catalyzer through conduit 14 and into column 16 which is operated under conditions whereby acetic acid is caused to separate out through 18 or 20 from which it may be withdrawn for use. The other materials which include a substantial amount of hydrogen pass through conduit 19 and the several condensers in which the other materials are separated to some extent from the hydrogen. The hydrogen may then be conducted to scrubber 23 or other device into which feed alcohol may be injected at 27. The separated materials, separated by feed alcohol through 27, since they include unreacted alcohol and aldehyde, etc., may be recirculated through the system by conducting them through conduit 24 to the feed tank 28.

For further purposes of illustration, tabulated below are the data on a run exemplifying my process as applied to a mixture of ethyl alcohol and water. It will be observed that various rates of flow and conditions of operation were employed. While I wish to emphasize my process as applied to aqueous ethyl alcohol and while my process is particularly adapted thereto, useful results may be obtained by applying a similar treatment to aqueous solutions containing propyl and butyl alcohols and aldehydes.

Table I

| Meter reading | Volume of 1:3 alcohol-water used | Rate of flow per minute | Alcohol used weight | Acetic acid produced weight | Yield of acetic acid, percent |
|---|---|---|---|---|---|
| 0 | | | | | |
| 60 | 60 | 1.00 | 25.7 | 8.96 | 26.7 |
| 120 | 60 | 0.857 | 25.7 | 10.07 | 30.0 |
| 180 | 60 | 1.00 | 25.7 | 9.50 | 28.3 |
| 240 | 60 | 1.00 | 25.7 | 10.10 | 30.1 |
| 300 | 60 | 0.968 | 25.7 | 10.20 | 30.4 |

(The above data are expressed in metric units.)

The alcohol-water ratio 1:3 (molar ratio) is satisfactory for ethyl alcohol but may be varied, 1:1 to 1:5 for example. These other ratios may also be used for propyl alcohol and butyl alcohol treatment.

My novel catalyst gives substantial and uniform production of acetic acid over a period of use. The overall percentage yield of acetic acid may be increased by re-circulation, pre-heating and a number of other expedients. The values set forth in the above tabulation merely represent the conversion for a single pass.

In view of the fact that my catalyst may be prepared from simple and inexpensive materials which are readily obtainable and which yield a catalyst that stands up satisfactorily under commercial conditions, it is economically feasible to obtain smaller yields, and possibly smaller yields than obtainable by other catalysts that could not stand up any satisfactory length of time under operating conditions. My catalyst, when prepared under the optimum conditions, as already outlined, by oxidizing the chipped alloy, yields a product which appears to be oxidized throughout. Hence, upon subsequent reduction, the catalyst is apparently completely reduced, at least probably as to the copper oxide content and may be readily distinguished by a spongy appearance throughout rather than just presenting a surface layer of porous catalyst with the center portion of the alloy unchanged.

My alloy catalyst may contain aluminum, boron, calcium, sodium and silicon. Certain of these elements may be picked up from the fluxes or crucibles used in the catalyst preparation.

As indicated, my process may be applied to components other than ethyl alcohol, such as propyl and butyl. The following table illustrates a run with propyl alcohol-water. The run was made with 1:3 propanol-water (molar ratio) at a catalyst temperature of about 320° C.:

Table II

| Volume 1:3 used | Weight of propanol used | Volume of product | Weight propionic acid | Percent yield |
|---|---|---|---|---|
| 30 | 14.16 | 23.0 | 7.13 | 40.8 |
| 60 | 28.32 | 49.5 | 15.32 | 43.9 |
| 60 | 28.32 | 48.5 | 14.61 | 41.8 |
| 60 | 28.32 | 50.0 | 13.83 | 39.6 |
| 60 | 28.32 | 49.0 | 14.34 | 41.1 |
| 60 | 28.32 | 49.0 | 14.34 | 41.1 |
| 60 | 28.32 | 49.0 | 14.48 | 41.5 |

(The above data are in metric units.)

From the preceding disclosure, it will be apparent that my invention may be carried out with a number of modifications. It will also be understood that customary precautions for preventing any heating losses by suitable insulation will be observed. The parts which contact with acid or corrosive agents are constructed out of suitable materials such as aluminum alloys, copper or copper alloys, and silicon alloys and various types of stainless steel, such as, for example, the steel containing about 15–20% chromium, 7–15% nickel, with the balance iron, excepting low carbon content, generally below .10% and containing varying amounts say between about .10% and 5% copper, tungsten, molybdenum and silicon. The process is preferably operated under about atmospheric or a slight external pressure to cause the passage of the material through the system. My process may be carried out under higher pressure or reduced pressure may be applied to the exit end of the equipment in order to cause the materials to pass therethrough.

It is therefore apparent while I have described my invention in some detail, there are many changes which may be made therein without departing from the spirit thereof. Hence, I do not wish to be limited excepting insofar as is necessitated by the prior art and the spirit of the appended claims.

What I claim and desire to secure by Letters Patent of the United States is:

1. A catalytic process for preparing aliphatic acids which comprises reacting an aliphatic alcohol with a molar amount of water greater than the alcohol in the presence of a copper, zinc, manganese alloy catalyst, and maintaining the temperature of the catalyst at about 290° C. to 350° C.

2. A process for treating aqueous alcohol solutions which comprises reacting a mixture containing aliphatic alcohol and at least an equal molar quantity of water in the presence of a catalyst comprising about 70 to 90% copper, 5 to 15% zinc, and 2 to 10% manganese, and maintaining the temperature of the catalyst between about 300 to 330° C.

3. A process for the preparation of acetic acid which comprises reacting a mixture containing ethyl alcohol together with a molar quantity of water two to four times the molar quantity of alcohol in the presence of a catalyst containing small amounts of zinc and manganese, the balance being principally copper, and maintaining the reaction at a temperature between about 310 to 330° C.

4. A process for the preparation of acetic acid which comprises reacting a mixture containing ethyl alcohol together with a molar quantity of water three times the molar quantity of alcohol in the presence of a catalyst containing small amounts of zinc and manganese, the balance being principally copper, and maintaining the reaction at a temperature between about 310 to 330° C.

5. A process for the preparation of aliphatic acid containing three to four carbon atoms which comprises reacting three to four carbon atom alcohol and water in the presence of an alloy catalyst comprised principally of copper with smaller quantities of manganese and zinc, and maintaining the temperature of the reaction between about 250 to 450° C.

6. A process for treating aqueous propyl alcohol solutions which comprises reacting a mixture containing propyl alcohol and water in the presence of alloy catalyst shavings containing copper, manganese, and zinc, and maintaining the reaction at a temperature between about 300° C. and 340° C.

7. A catalytic process for treating aqueous alcohol solutions which comprises reacting a mixture containing aliphatic alcohol, aliphatic aldehyde, and water, in the presence of a copper, zinc, manganese alloy catalyst, maintaining the reaction at a temperature between 250 to 400° C. whereby vapors containing aliphatic acid and hydrogen are produced, subjecting the vapors to treatment which removes acid therefrom and permits hydrogen, unreacted alcohol and aldehyde to pass on, subjecting the hydrogen-containing vapors to treatment which removes the unreacted components therefrom and returning the unreacted components into further contact with the alloy catalyst.

8. A process for converting ethyl alcohol to acetic acid which comprises feeding a mixture of ethyl alcohol with at least an equal molar quantity of water in contact with an alloy catalyst containing copper, manganese and zinc, maintaining the temperature of the reaction at 290° C. to 340° C., whereby vapors containing acetic acid, hydrogen and unreacted materials are formed, separating acetic acid from the hydrogen-containing vapors by means of incoming ethyl alcohol being employed for the aforementioned alcohol feed.

9. A process for converting an aldehyde into an aliphatic acid which comprises reacting an aliphatic aldehyde containing from two to four carbon atoms and a molar quantity of water at least equal to the molar quantity of aldehyde, carrying out the reaction between about 300 to 350° C. in the presence of a catalyst obtained by oxidizing alloy shavings containing copper, zinc and manganese followed by reduction thereof.

10. A process for converting acetaldehyde into acetic acid which comprises reacting acetaldehyde and a quantity of water at least equal to the quantity of acetaldehyde, carrying out the reaction between about 300 to 350° C. in the presence of a catalyst obtained by oxidizing alloy shavings containing copper, zinc and manganese followed by reduction thereof.

11. A process for preparing catalysts for use in converting aqueous alcohol into aliphatic acid, which comprises preparing a copper, manganese and zinc alloy, machining the alloy into rough particles, and oxidizing and reducing the alloy particles.

WILLIAM O. KENYON.